United States Patent
Jung

(10) Patent No.: US 10,783,856 B2
(45) Date of Patent: Sep. 22, 2020

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventor: MuKyung Jung, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 50 days.

(21) Appl. No.: 16/212,247

(22) Filed: Dec. 6, 2018

(65) Prior Publication Data
US 2020/0105230 A1 Apr. 2, 2020

(30) Foreign Application Priority Data
Sep. 28, 2018 (KR) .................. 10-2018-0115416

(51) Int. Cl.
G09G 5/38 (2006.01)
B60K 35/00 (2006.01)
(Continued)

(52) U.S. Cl.
CPC .............. *G09G 5/38* (2013.01); *B60K 35/00* (2013.01); *B60K 37/02* (2013.01); *B60R 1/00* (2013.01); *G06F 3/013* (2013.01); *G06T 7/50* (2017.01); *G06T 7/70* (2017.01); *B60K 2370/152* (2019.05); *B60K 2370/18* (2019.05); *B60K 2370/52* (2019.05); *B60N 2/02* (2013.01); *B60R 2300/10* (2013.01); *B60R 2300/207* (2013.01); *G06T 2207/10048* (2013.01); *G06T 2207/30201* (2013.01); *G06T 2207/30268* (2013.01);
(Continued)

(58) Field of Classification Search
None
See application file for complete search history.

(56) References Cited

U.S. PATENT DOCUMENTS

2013/0282240 A1 10/2013 Nada et al.
2015/0328985 A1* 11/2015 Kim ............... B60K 28/066
180/272

FOREIGN PATENT DOCUMENTS

JP 11-314538 A 11/1999
JP 2012-95921 A 5/2012

* cited by examiner

*Primary Examiner* — Michelle Chin
(74) *Attorney, Agent, or Firm* — Morgan, Lewis & Bockius LLP

(57) ABSTRACT

A vehicle includes: a position-adjustable steering wheel, a position-adjustable driver's seat, a display extending on the dashboard from one side facing the driver's seat to another side in which a center fascia is disposed, at least one image sensor configured to capture a vehicle interior image to obtain the vehicle interior image, a storage configured to store driver's seat positioning information of the driver's seat and steering wheel positioning information of the steering wheel, and a controller configured to obtain eye position information indicating a position of each of eyes of the driver with respect to the steering wheel based on at least one of the driver's seat positioning information or the vehicle interior image, determine a covered area on the display, covered by the steering wheel, based on the eye position information and the steering wheel positioning information, and adjust an output position of an image output on the display based on the covered area.

22 Claims, 9 Drawing Sheets

(51) Int. Cl.
  *B60K 37/02* (2006.01)
  *B60R 1/00* (2006.01)
  *G06F 3/01* (2006.01)
  *G06T 7/50* (2017.01)
  *G06T 7/70* (2017.01)
  *B60N 2/02* (2006.01)
(52) U.S. Cl.
  CPC . *G09G 2320/0613* (2013.01); *G09G 2354/00* (2013.01); *G09G 2380/10* (2013.01)

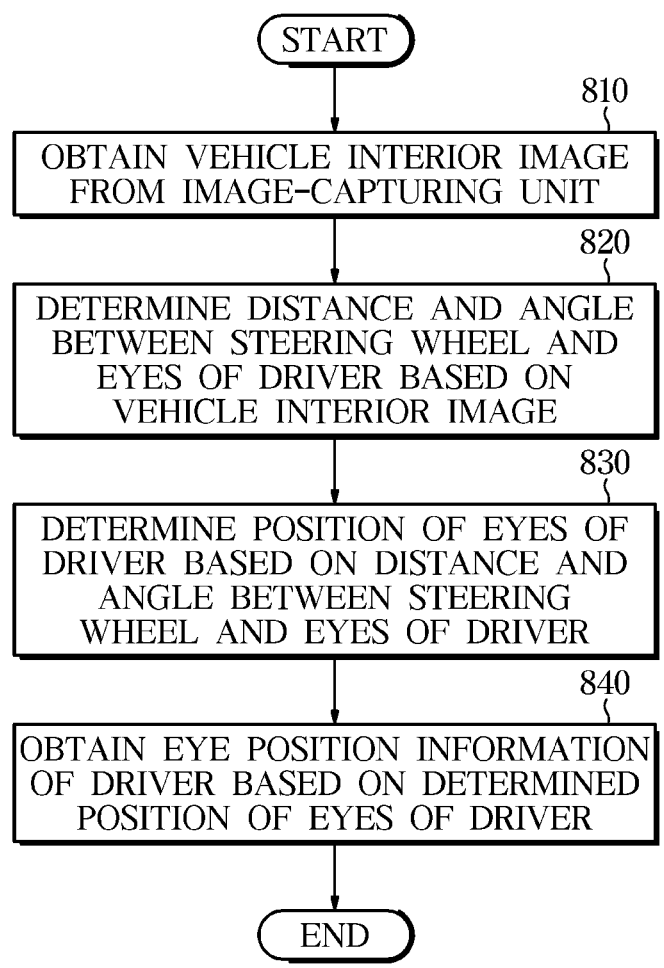

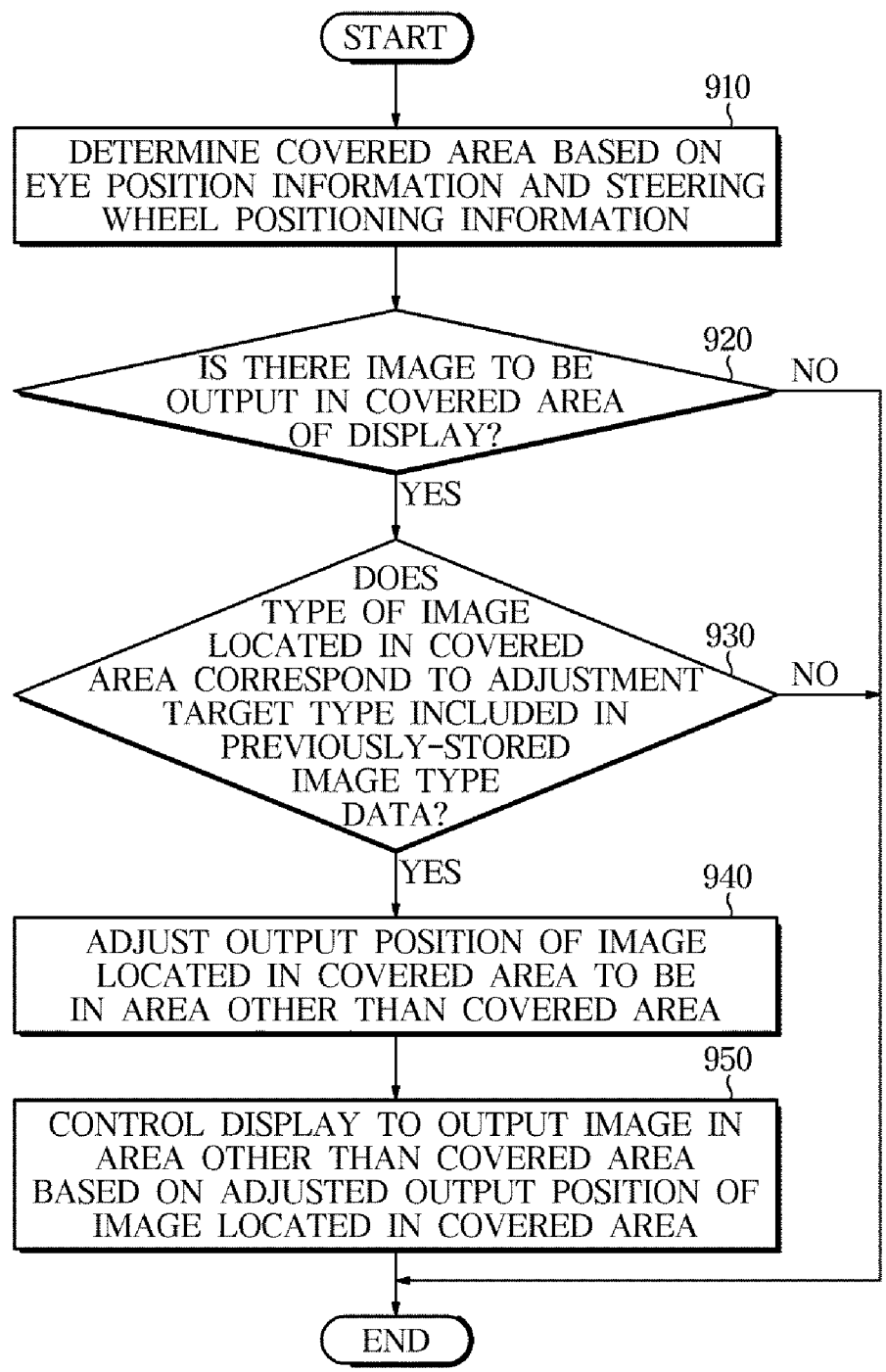

VEHICLE AND CONTROL METHOD THEREOF

CROSS-REFERENCE TO RELATED APPLICATION

This application claims the benefit of Korean Patent Application No. 10-2018-0115416 filed on Sep. 28, 2018 in the Korean Intellectual Property Office, the disclosure of which is incorporated herein by reference.

TECHNICAL FIELD

The present disclosure relates to a vehicle capable of controlling a display covered by a steering wheel and a control method thereof.

BACKGROUND

In general, a cluster providing information to a driver by displaying the information in a digital or analog format is installed in the interior of a vehicle, in front of a driver's seat. In addition, the vehicle includes a central information display (CID) located in a center fascia to display information regarding a video display, a navigation system, or the like.

Recently, researches on integrated displays in which the cluster and the CID are integrated into a single display have been actively undertaken, in consideration of installation space, visibility, operability, and marketability.

SUMMARY

It is an aspect of the present disclosure to provide a vehicle configured to provide an image to a driver by adjusting an output position of the image on a display, covered by a steering wheel, and a control method of the vehicle.

Additional aspects of the disclosure will be set forth in part in the description which follows and, in part, will be obvious from the description, or may be learned by practice of the disclosure.

In accordance with one aspect of the present disclosure, a vehicle includes: a position-adjustable steering wheel; a position-adjustable driver's seat; a display extending on the dashboard from one side facing the driver's seat to another side in which a center fascia is disposed; at least one image sensor configured to capture a vehicle interior image including a facial image of a driver; a storage configured to store driver's seat positioning information of the driver's seat and steering wheel positioning information of the steering wheel; and a controller configured to obtain eye position information indicating a position of each of eyes of the driver with respect to the steering wheel based on at least one of the driver's seat positioning information and the vehicle interior image, determine a covered area on the display, covered by the steering wheel based on the eye position information and the steering wheel positioning information, and adjust an output position of an image output on the display based on the covered area.

The driver's seat positioning information may include at least one of position information of the driver's seat and angle information of the driver's seat.

The controller may obtain the eye position information by determining a distance and an angle between the steering wheel and the driver's seat based on the driver's seat positioning information and determining the position of the eyes of the driver based on the distance and the angle between the steering wheel and the driver's seat and driver height information.

The at least one image sensor may include at least one of a camera configured to capture the vehicle interior image in a visible light range and an infrared (IR) camera configured to capture the vehicle interior image in an IR ray range.

The controller may obtain the eye position information by determining a distance and an angle between the steering wheel and the eyes of the driver based on the vehicle interior image captured by the at least one image sensor and determining the position of the eyes of the driver based on the distance and the angle between the steering wheel and the eyes of the driver.

The eye position information may include distance information between the steering wheel and the position of the eyes of the driver and angle information between the steering wheel and the position of the eyes of the driver.

The controller may determine whether or not an image to be output in the covered area of the display is present.

When the image to be output in the covered area is present, the controller may compare a type of the image with previously-stored image type data and determine whether or not the type of the image corresponds to an adjustment target type (or a type to be adjusted) included in the image type data.

The adjustment target type may include at least one of a rear side image, a rear image, and driving information of the vehicle.

The vehicle may further include an input device receiving an input of the driver. The controller may update the image type data by determining the adjustment target type based on the input of the driver.

When the type of the image corresponds to the adjustment target type, the controller may adjust the output position of the image to be in an area other than the covered area.

The controller may control the display to output the image based on the adjusted output position of the image.

In accordance with another aspect of the present disclosure, a control method of a vehicle includes: obtaining a vehicle interior image including a facial image of a driver using at least one image sensor; obtaining driver's seat positioning information of a driver's seat and steering wheel positioning information of the steering wheel stored in a storage, wherein the driver's seat and the steering wheel are position-adjustable; obtaining eye position information indicating a position of each of eyes of the driver with respect to the steering wheel based on at least one of the driver's seat positioning information and the vehicle interior image; determining a covered area, which is covered by the steering wheel on a display, based on the eye position information and the steering wheel positioning information, wherein the display extends from one side of a dashboard facing the driver's seat to another side of the dashboard, in which a center fascia is disposed; and adjusting an output position of an image output on the display based on the covered area.

The driver's seat positioning information may include at least one of position information of the driver's seat and angle information of the driver's seat.

The obtaining of the eye position information may include: determining a distance and an angle between the steering wheel and the driver's seat based on the driver's seat positioning information; and determining the position of the eyes of the driver based on the distance and the angle between the steering wheel and the driver's seat and driver height information.

The vehicle interior image may include at least one of the vehicle interior image in a visible light range and the vehicle interior image in an IR ray range.

The obtaining of the eye position information may include: determining a distance and an angle between the steering wheel and the eyes of the driver based on the vehicle interior image captured by the at least one image sensor; and determining the position of the eyes of the driver based on the distance and the angle between the steering wheel and the eyes of the driver.

The eye position information may include distance information between the steering wheel and the position of the eyes of the driver and angle information between the steering wheel and the position of the eyes of the driver.

The control method may further include determining whether or not an image to be output in the covered area of the display is present.

The control method may further include, when the image to be output in the covered area is present, comparing a type of the image with previously-stored image type data and determining whether or not the type of the image corresponds to an adjustment target type included in the image type data.

The adjustment target type may include at least one of a rear side image, a rear image, and driving information of the vehicle.

The control method may further include: receiving an input of the driver; and updating the image type data by determining the adjustment target type based on the input of the driver.

The control method may further include, when the type of the image corresponds to the adjustment target type, adjusting the output position of the image to be in an area other than the covered area.

The control method may further include controlling the display to output the image based on the adjusted output position of the image.

A vehicle and control method of a vehicle according to an aspect provide an image, not covered by a steering wheel, to a driver by adjusting an output position of the image on a display covered by the steering wheel.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 8 is a flowchart illustrating a process of obtaining eye position information based on a vehicle interior image in the control method of the vehicle according to an exemplary embodiment of the present disclosure; and FIG. 9 is a flowchart illustrating a process of adjusting the output position of the image in the control method of the vehicle according to an exemplary embodiment of the present disclosure.

DETAILED DESCRIPTION

Figure 1:
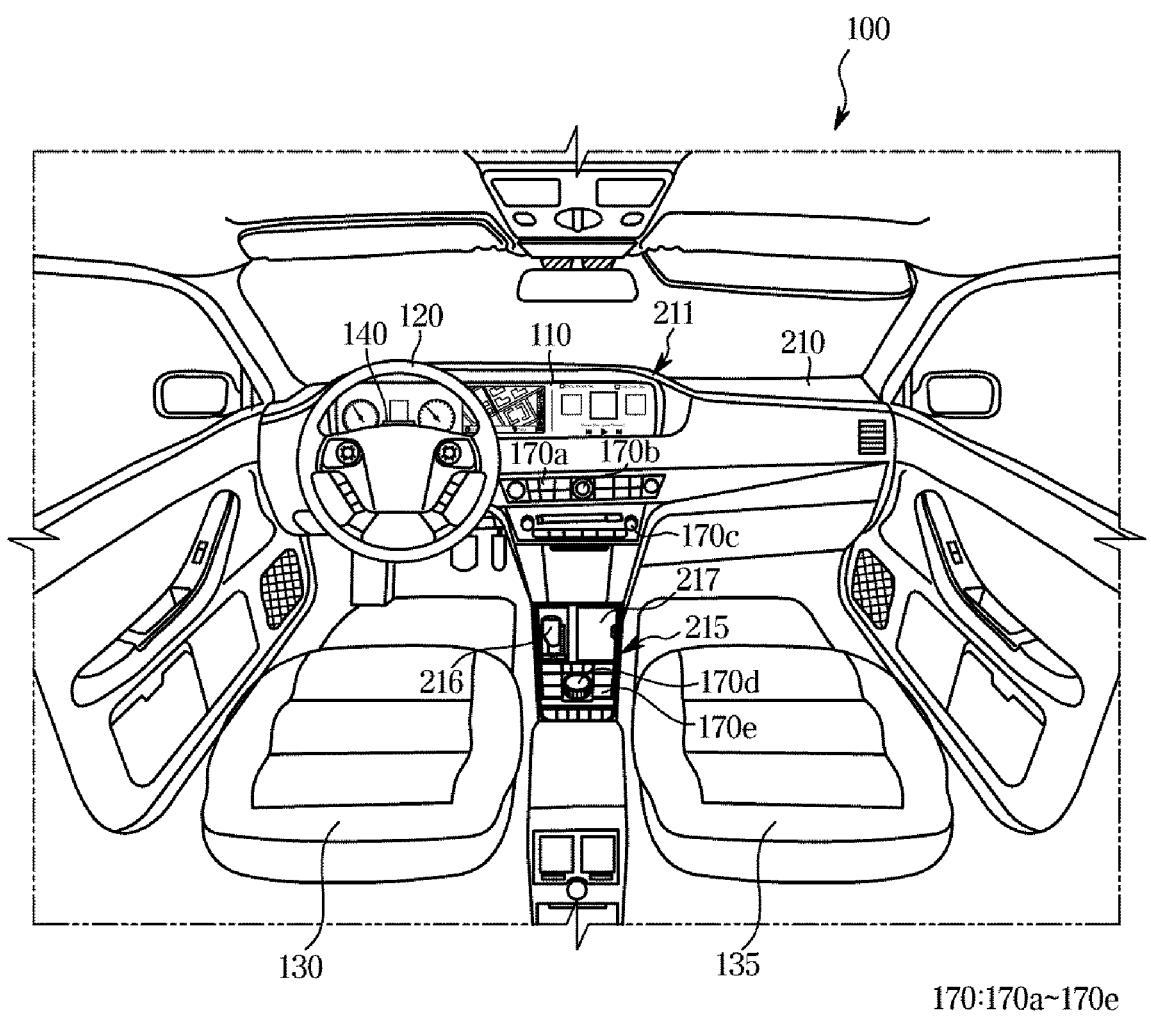
FIG. 1 is a view illustrating the interior of a vehicle according to an exemplary embodiment of the present disclosure.

Throughout this document, the same reference numerals and symbols will be used to designate the same or like components. In the following description of the present disclosure, detailed descriptions of known functions and configurations incorporated herein will be omitted when the subject matter of the present disclosure may be rendered rather unclear thereby.

It will be understood herein that, when a portion is referred to as being "connected to" another portion, not only can it be "directly connected to" the other portion, but it can also be "indirectly connected to" the other portion. When the portion is referred to as being indirectly connected to the other portion, the portion may be connected to the other portion via a wireless communications network.

It will be understood that the terms "comprise," "include," "have," and any variations thereof used herein are intended to cover non-exclusive inclusions unless explicitly described to the contrary.

Descriptions of components in the singular form used herein are intended to include descriptions of components in the plural form, unless explicitly described to the contrary.

As used herein, the terms, such as "unit," "device," "block," "member," and "module," may refer to a unit processing at least one function or operation. For example, these terms may mean at least one piece of hardware, such as a field-programmable gate array (FPGA) or an application specific integrated circuit (ASIC), at least one piece of software stored in memory, or at least one process processed by a processor.

The reference numerals or symbols in respective stages are only used to distinguish the respective stages from the other stages, and do not necessarily describe an order of the respective stages. The respective stages may be performed in a different order from the described order, unless a specific order is described in the context.

Hereinafter, embodiments of a vehicle and a control method thereof according to an aspect of the present disclosure will be described in detail with reference to the accompanying drawings.

Figure 2:
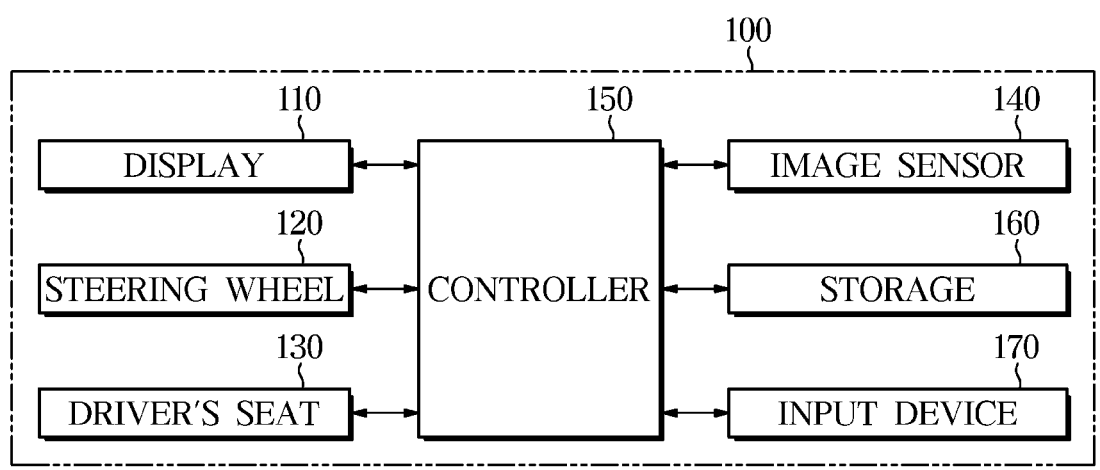
FIG. 2 is a control block diagram of the vehicle according to an exemplary embodiment of the present disclosure.
Figure 3:
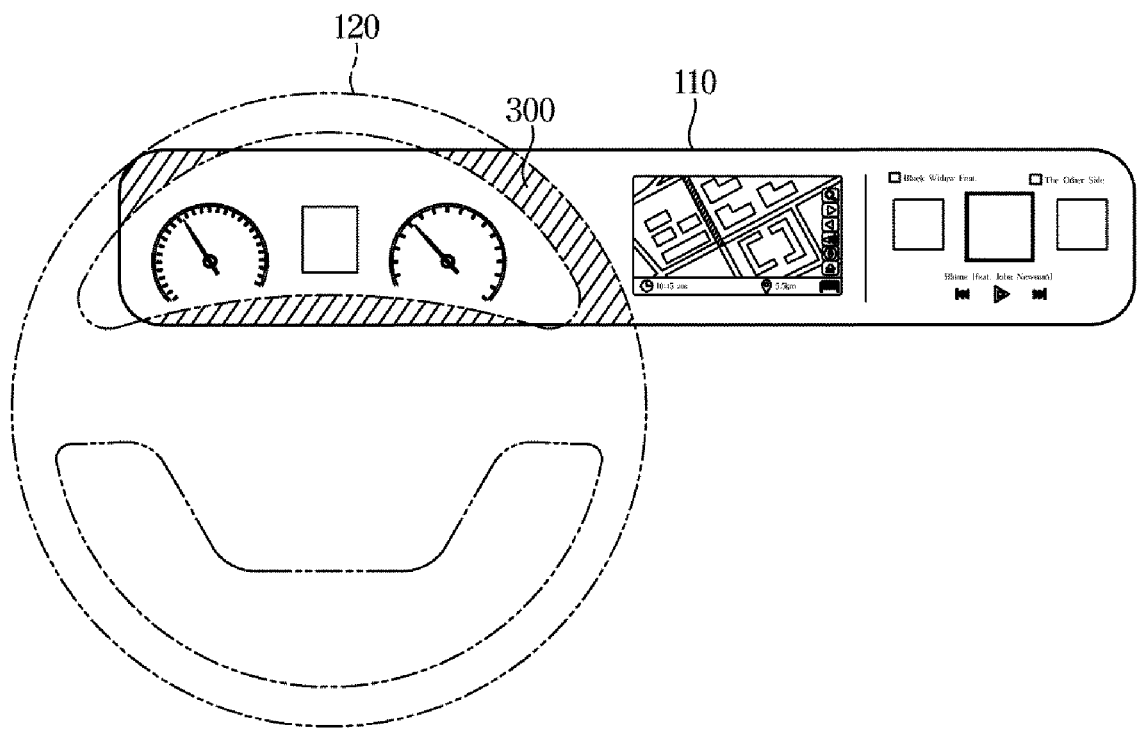
FIG. 3 is a view illustrating a covered area on a display, covered by a steering wheel, according to an exemplary embodiment of the present disclosure.

FIG. 1 is a view illustrating an interior of a vehicle 100 according to an embodiment, FIG. 2 is a control block diagram of the vehicle 100 according to an embodiment, and FIG. 3 is a view illustrating a covered area 300 on a display 110, covered by a steering wheel 120, according to an embodiment.

Referring to FIGS. 1 and 2, the display 110, the steering wheel 120, a driver's seat 130, a front passenger seat 135, at least one image sensor 140, input devices 170, and a dashboard 210 are provided in the interior of the vehicle 100. The dashboard 210 refers to a panel dividing the interior and the engine compartment of the vehicle 100 and accommodating a variety of components required for driving installed therein. The dashboard 210 is provided ahead of the driver's seat 130 and the front passenger seat 135. The dashboard 210 may include an upper panel, a center fascia 211, a center console 215, and the like.

The center fascia 211 may be installed in a central portion of the dashboard 210, and be provided in a space between the driver's seat 130 and the front passenger seat 135.

The display 110 may be installed in the dashboard 210. The display 110 according to an embodiment may be disposed to extend laterally from a portion of the dashboard 210, ahead of the driver's seat 130, to another portion of the dashboard 210, ahead of a space between the driver's seat 130 and the front passenger seat 135.

That is, the display 110 according to an embodiment may be disposed to extend from an area of the dashboard 210 facing the driver's seat 130 to another area of the dashboard 210, in which the center fascia 211 is provided.

In addition, differently from the drawings, the area in which the display 110 according to an embodiment is disposed may further extend to a portion of the area ahead of the front passenger seat 135.

As described above, the display 110 may have a large output area laterally elongated on the dashboard 210 of the vehicle 100 to display various pieces of information thereon.

The display 110 according to an embodiment may provide various pieces of information to the driver of the vehicle 100 using images. For example, the display 110 may visually provide various pieces of information, such as a map, weather, news, various video or still images, and information regarding the status or operation of the vehicle 100, e.g. information regarding an air conditioner.

Specifically, the display 110 according to an embodiment may output cluster display information, information regarding an audio, video, and navigation (ANV) system, information regarding the air conditioner, and information regarding devices within the vehicle 100, using images. The display 110 may output various pieces of information in response to a control signal of a controller 150, which will be described later.

Here, the cluster display information may include pieces of information displayed on an existing cluster. For example, the cluster display information may include driving information, such as a vehicle speed, an engine revolutions per minute (RPM), a cooling water temperature, a fuel level, a shift gear status, a driven distance, and a drivable distance, as well as information indicating an operating status of a variety of devices within the vehicle, a warning status, such as an unfastened seat belt or an open door, or the like.

In addition, the information regarding the AVN system may include known pieces of information provided by audio, video, and navigation devices. For example, the information regarding the AVN system may include information regarding an operating status of audio and video devices, information regarding video images, sound sources, and images, navigation display information regarding a map on which a driving route is displayed or the like, and device-related setting information.

Furthermore, the information regarding the air conditioner may be known pieces of information regarding the air conditioner, including display information provided by an air conditioning controller, i.e. information regarding an operating status, an operating mode, and the like of the air conditioner, set information regarding air conditioning, and other pieces of information, such as an indoor temperature and an outdoor temperature.

In addition, the information regarding the devices within the vehicle 100 may include information regarding an operating status, an operating mode, and the like of a convenience device, such as a ventilation seat, and the other devices within the vehicle 100, set information regarding such devices, and the like.

In addition, the display 110 according to an embodiment may output an external image of the vehicle received from cameras disposed on outer surfaces of the vehicle 100.

For example, the external image of the vehicle may include a forward image captured using a forward-facing camera (not shown) provided on a front portion of the vehicle 100, a rear image captured using a rear-facing camera (not shown) provided on a rear portion of the vehicle 100, and rear side images captured using side cameras (not shown) provided on side portions of the vehicle 100.

The display 110 according to an embodiment may simultaneously output two or more pieces of information among the cluster display information, the information regarding the AVN system, the information regarding the air conditioner and the devices within the vehicle 100, and the external image of the vehicle by dividing an output area of the display 110.

Various types of devices, such as a processor, a communication module, a satellite navigation system receiver module, and a storage device, may be installed inside the dashboard 210. The processor installed in the vehicle 100 may be provided to control a variety of electronic devices installed in the vehicle 100 and may be provided to serve as the controller 150, which will be described later. The above-described devices may be implemented using a variety of components, such as a semiconductor chip, a switch, an integrated circuit (IC), a resistor, volatile or non-volatile memory, or a printed circuit board (PCB).

The center fascia 211 may be installed in the central portion of the dashboard 210. Input devices 170a to 170c, allowing a variety of instructions related to the vehicle 100 to be input, may be provided. Each of the input devices 170a to 170c may be implemented using a physical button, a knob, a touchpad, a touchscreen, a control stick, a trackball, or the like.

The center console 215 is provided below the center fascia 211, between the driver's seat 130 and the front passenger seat 135. A gear stick 216, a console 217, and a variety of input devices 170d and 170e, and the like may be provided in the center console 215. Each of the input devices 170d and 170e may be implemented using a physical button, a knob, a touchpad, a touchscreen, a control stick, a trackball, or the like. The console 217 and the input devices 170d and 170e may be omitted according to embodiments.

In addition, the input devices 170 may be integrated with the display 110 and be implemented using a touchscreen. The input devices 170 may be located without limitations in any place in which the input devices 170 may receive inputs of the driver.

The driver may control a variety of operations of the vehicle 100 by manipulating the input devices 170.

For example, the input devices 170 according to an embodiment may receive positioning information of the driver's seat 130 (hereinafter, referred to as "driver's seat positioning information") and positioning information of the steering wheel 120 (hereinafter, referred to as "steering wheel positioning information") from the driver. The controller 150, which will be described later, may adjust positions and angles of the driver's seat 130 and the steering wheel 120 based on the driver's seat positioning information and the steering wheel positioning information input via the input devices 170.

That is, the driver's seat 130 according to an embodiment may be positioned according to the input of the driver using the input devices 170. In addition, the steering wheel 120 according to an embodiment may be positioned according to the input of the driver using the input devices 170. This will be described in detail later.

The steering wheel 120 and the at least one image sensor 140 are provided on the dashboard 210, ahead of the driver's seat 130.

The steering wheel 120 is provided to be rotatable in a predetermined direction in response to the manipulation of the driver, and front or rear wheels of the vehicle 100 may be turned along the direction in which the steering wheel 120 rotates, so that the vehicle 100 may be steered. The steering wheel 120 may have a circular shape for driver convenience, but the shape of the steering wheel 120 is not limited thereto.

In addition, the at least one image sensor 140 may be provided on at least one side of the steering wheel 120 in the front direction of the driver. Specifically, the at least one image sensor 140 according to an embodiment may be provided on a rear side of the steering wheel 120. For example, the at least one image sensor 140 may be provided between the steering wheel 120 and the dashboard 210. Here, the position of the at least one image sensor 140 may include, without limitations, any position provided on at least one side of the steering wheel 120, as long as the at least one image sensor 140 may capture an image of the interior of the vehicle (hereinafter, referred to as a "vehicle interior image") including a facial image of the driver, in that position.

That is, the at least one image sensor 140 according to an embodiment may capture the vehicle interior image including the facial image of the driver. The controller 150, which will be described later, may determine a position of eyes of the driver based on the vehicle interior image captured by the at least one image sensor 140.

The at least one image sensor 140 according to an embodiment may include at least one camera to capture the vehicle interior image in a visible light range.

In addition, the at least one image sensor 140 according to an embodiment may include an infrared (IR) camera to capture the vehicle interior image in an IR ray range. Accordingly, the at least one image sensor 140 may capture a facial image of the driver based on the vehicle interior image in the IR ray range, even in the case in which the facial image of the driver cannot be captured based on the vehicle interior image in the visible light range.

Referring to FIG. 3, since the display 110 is disposed to extend from one area of the dashboard 210 facing the driver's seat 130 to another area of the dashboard 210, in which the center fascia 211 is provided, the display 110 may be covered by the steering wheel 120.

That is, a covered area 300 covered by the steering wheel 120 may be present in the output area of the display 110. In other words, in the vehicle 100, the covered area 300 on the display 110 may be generated by the steering wheel 120.

Thus, the driver cannot view an image located within the covered area 300 of the display 110, and must move his or her body to watch the image in the covered area 300.

When information indicated by the image located in the covered area 300 corresponds to important information for driving of the vehicle 100, the probability of the occurrence of a vehicle accident may be increased. The important information may be, for example, driving information, such as a vehicle speed, an engine RPM, a cooling water temperature, a fuel level, a shift gear status, a driven distance, and a drivable distance.

In addition, when the driver of the vehicle 100 moves his or her body to check information indicated by the image present in the covered area 300, the probability of the occurrence of a vehicle accident may be increased.

Accordingly, when the vehicle 100 according to an embodiment has the display 110 extending from one area of the dashboard 210 facing the driver's seat 130 to another area in the dashboard 210, in which the center fascia 211 is provided, the vehicle 100 may adjust an output position of an image located in the covered area 300 covered by the steering wheel 120 to provide an uncovered image to the driver. Hereinafter, the controller 150 adjusting the output position of the image on the display 110 will be described.

Referring again to FIG. 2, the controller 150 according to an embodiment may obtain eye position information indicating the position of the eyes of the driver with respect to the steering wheel 120.

The controller 150 may determine the covered area 300 on the display 110, covered by the steering wheel 120, by obtaining the eye position information.

Specifically, the controller 150 according to an embodiment may obtain the eye position information indicating the position of the eyes of the driver with respect to the steering wheel 120 based on the driver's seat positioning information.

The driver's seat positioning information may include position information of the driver's seat 130 and angle information of the driver's seat 130. The position information of the driver's seat 130 may include front-rear position information of a cushion of the driver's seat and height information of the cushion of the driver's seat. The angle information of the driver's seat 130 may include angle information of a backrest of the driver's seat.

The driver's seat positioning information may be input by the driver using the input devices 170. The controller 150 may adjust the position and angle of the driver's seat 130 based on the input driver's seat positioning information.

In addition, the driver's seat positioning information may be stored in a storage 160, which will be described later. The controller 150 according to an embodiment may obtain the driver's seat positioning information in determination of the covered area 300 from the storage 160.

The controller 150 according to an embodiment may determine a distance between the steering wheel 120 and the driver's seat 130 and an angle between the steering wheel 120 and the driver's seat 130 based on the driver's seat positioning information.

The controller 150 may determine the position of the eyes of the driver based on the distance and angle between the steering wheel 120 and the driver's seat 130 and driver height information, and obtain the eye position information based on the determined position of the eyes of the driver.

The driver height information according to an embodiment may correspond to height information of the driver input by the driver using the input devices 170 and stored in the storage 160.

In addition, the driver height information according to an embodiment may correspond to average height information of adults stored in the storage 160.

The controller 150 according to an embodiment may obtain the eye position information indicating the position of the eyes of the driver with respect to the steering wheel 120 based on the vehicle interior image captured by the at least one image sensor 140.

The controller 150 may determine a distance between the steering wheel 120 and the eyes of the driver and an angle between the steering wheel 120 and the eyes of the driver based on the vehicle interior image captured by the at least one image sensor 140.

The controller 150 may determine the position of the eyes of the driver based on the distance between the steering wheel 120 and the eyes of the driver and the angle between the steering wheel 120 and the eyes of the driver, and obtain the eye position information based on the position of the eyes of the driver.

That is, the controller 150 according to an embodiment may obtain the eye position information indicating the position of the eyes of the driver with respect to the steering wheel 120 based on at least one of the driver's seat positioning information and the vehicle interior image.

The eye position information according to an embodiment may include distance information between the steering wheel 120 and the eyes of the driver and angle information between the steering wheel 120 and the eyes of the driver.

The controller 150 according to an embodiment may determine the covered area 300 on the display 110, covered by the steering wheel 120, based on the eye position information and the steering wheel positioning information.

Specifically, the controller 150 may determine the covered area 300 based on the eye position information indicating the position of the eyes of the driver with respect to the steering wheel 120 and the steering wheel positioning information indicating the position and angle of the steering wheel 120.

The controller 150 may determine the covered area 300 on the display 110, covered from the driver's view by the steering wheel 120, based on the distance information between the steering wheel 120 and the position of the eyes of the driver and the angle information between the steering wheel 120 and the position of the eyes of the driver.

The controller 150 according to an embodiment may generate a plurality of virtual lines linearly connecting the position of the eyes of the driver and a plurality of points on the display 110 based on the eye position information, and determine some virtual lines, among the plurality of virtual lines, which are covered by the steering wheel 120 and not directly connected to the display 110, based on the steering wheel positioning information.

The controller 150 may determine the covered area 300 on the display 110, covered by the steering wheel 120, based on some virtual lines covered by the steering wheel 120 and not directly connected to the display 110 among the plurality of virtual lines.

The steering wheel positioning information may include at least one of position information of the steering wheel 120 and angle information of the steering wheel 120. The position information of the steering wheel 120 may include height information of the steering wheel 120 based on the floor surface of the vehicle 100, and the angle information of the steering wheel 120 may correspond to an angle of the steering wheel 120 oriented with respect to the floor surface of the vehicle 100.

The steering wheel positioning information may be input by the driver using the input devices 170. The controller 150 may adjust the position and angle of the steering wheel 120 based on the input steering wheel positioning information.

In addition, the steering wheel positioning information may be stored in the storage 160, which will be described later. The controller 150 according to an embodiment may obtain the steering wheel positioning information in determination of the covered area 300 from the storage 160.

The controller 150 according to an embodiment may adjust the output position of an image output on the display 110 based on the covered area 300.

Specifically, the controller 150 according to an embodiment may determine whether or not an image to be output in the covered area 300 of the display 110 is present.

When the image to be output in the covered area 300 is present, the controller 150 may compare a type of the image located in the covered area 300 with previously-stored image type data to determine whether or not the type of the image located in the covered area 300 corresponds to a type to be adjusted (hereinafter, referred to as an "adjustment target type") included in the image type data.

The image type data is stored in the storage 160, which will be described later, and includes a preset list of adjustment target types in order to determine a degree of importance of the image located in the covered area 300.

The adjustment target types according to an embodiment may include the external image of the vehicle, output on the display 110 as an image. The external image of the vehicle may correspond to information essentially required for safe driving of the vehicle 100. When the external image of the vehicle is located in the covered area 300 and the driver does not receive the external image of the vehicle, the probability of a vehicle accident may be increased. The external image of the vehicle may include, for example, a forward image, a rear image, and rear side images.

The adjustment target types according to an embodiment may include the driving information output on the display 110 as an image. The driving information may correspond to information essentially required for safe driving of the vehicle 100. When the driving information is located in the covered area 300 and the driver does not receive the driving information, the probability of a vehicle accident may be increased. The driving information may include a vehicle speed, an engine RPM, a cooling water temperature, a fuel level, a shift gear status, a driven distance, a drivable distance, and the like.

The external image of the vehicle and the driving information, which may be directly related to safe driving of the vehicle 100, as described above, may be set as default values of the adjustment target types and included in the image type data.

Accordingly, when the external image of the vehicle and the driving information are located in the covered area 300, the controller 150 may adjust the output position of an image indicating the external image of the vehicle and the driving information, so that the driver may receive the external image of the vehicle and the driving information, which are not covered.

In addition, the adjustment target types according to an embodiment may be set based on inputs made by the driver using the input devices 170. That is, the driver may set adjustment target types to be output position adjustment targets among images located within the covered area 300 using the input devices 170.

Specifically, the controller 150 according to an embodiment may determine the adjustment target types based on inputs of the driver, and update the image type data based on the determined adjustment target types.

Accordingly, the vehicle 100 may adjust the output position of a type of image set by the driver among images located in the covered area 300 so as to provide the type of image desired by the driver.

When the image located in the covered area 300 corresponds to an adjustment target type, the controller 150 according to an embodiment may adjust the output position of the image located in the covered area 300 so as to be in an area other than the covered area 300. That is, the controller 150 may move the image located in the covered area 300 to an area other than the covered area 300.

The controller 150 according to an embodiment may control the display 110 to output the image in the area other than the covered area 300 based on the adjusted output position of the image located in the covered area 300.

As described above, the controller 150 may provide an image not covered by the steering wheel 120 to the driver by adjusting the output position of an image located in the covered area 300 on the display 110 covered by the steering wheel 120. Accordingly, the driver may be provided with the image not covered by the steering wheel 120 on the display 110, under the control of the controller 150.

The controller 150 may include at least one memory in which a program performing the foregoing and following operations is stored and at least one processor executing the stored program. A plurality of memories and a plurality of processors may be integrated into a single chip or may be distributed to physically separated locations.

The storage 160 according to an embodiment may store the driver's seat positioning information indicating the position and angle of the driver's seat 130 in the vehicle 100 and the steering wheel positioning information indicating the position and angle of the steering wheel 120 in the vehicle 100.

In addition, the storage 160 may store driver height information indicating at least one of the height information of the driver input via the input devices 170, and the average height information of adults.

In addition, the storage 160 may store image type data including a list of adjustment target types forming references for the adjustment of the output position of the image located in the covered area 300, and may store various pieces of information regarding the vehicle 100.

The storage 160 may be implemented using one selected from among, but not limited to, a nonvolatile memory device, such as a cache, read only memory (ROM), programmable ROM (PROM), erasable programmable ROM (EPROM), electrically erasable programmable ROM (EEPROM), and flash memory; a volatile memory device, such as random access memory (RAM); and a storage medium, such as a hard disk drive (HDD) or compact disc read only memory (CD-ROM), in order to store various pieces of information.

In addition, the vehicle 100 may include a communication module supporting vehicle network communications, such as controller area network (CAN) communications, local interconnect network (LIN) communications, and flex-ray communications. The display 110, the steering wheel 120, the driver's seat 130, the at least one image sensor 140, the controller 150, the storage 160, and the input devices 170 of the vehicle 100 may transmit and receive information to and from each other via communications modules.

Figure 4:
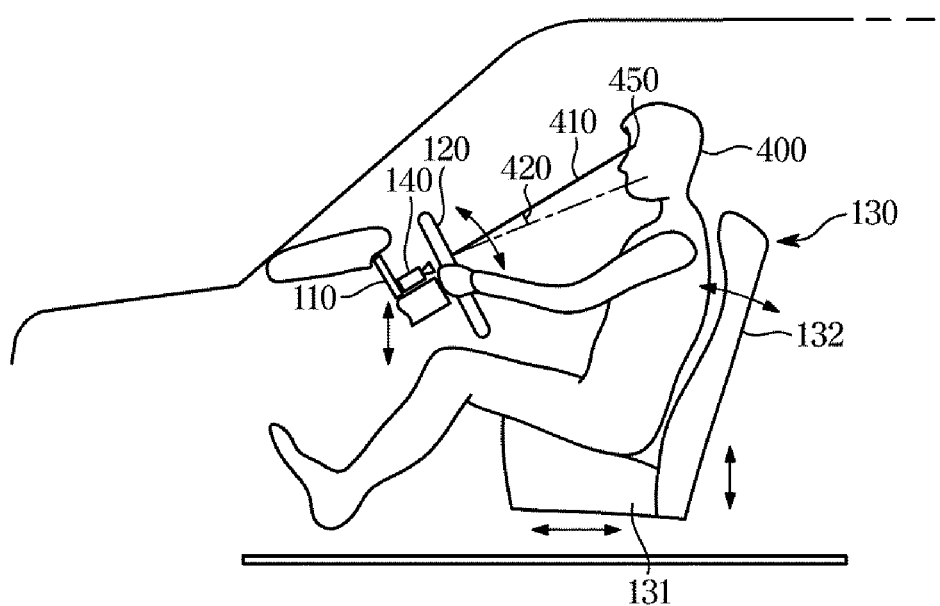
FIG. 4 is a view illustrating a situation in which the vehicle according to an exemplary embodiment of the present disclosure determines a position of eyes of a driver.

FIG. 4 is a view illustrating a situation in which the vehicle 100 according to an embodiment determines a position 450 of the eyes of a driver 400.

Referring to FIG. 4, the controller 150 according to an embodiment may obtain eye position information indicating the position 450 of the eyes of the driver 400 with respect to the steering wheel 120.

The controller 150 may determine the covered area 300 on the display 110, covered by the steering wheel 120, by obtaining the eye position information.

Specifically, the controller 150 according to an embodiment may obtain the eye position information indicating the position 450 of the eyes of the driver 400 with respect to the steering wheel 120 based on the driver's seat positioning information.

The driver's seat positioning information may include at least one of position information of the driver's seat 130 and angle information of the driver's seat 130. The position information of the driver's seat 130 may include front-rear position information of a cushion 131 of the driver's seat 130 and height information of the cushion 131 of the driver's seat 130. The angle information of the driver's seat 130 may include angle information of a backrest 132 of the driver's seat 130.

The driver's seat positioning information may be input by the driver 400 using the input devices 170. The controller 150 may adjust the position and angle of the driver's seat 130 based on the input driver's seat positioning information.

Specifically, the controller 150 may adjust the front-rear position of the cushion 131 of the driver's seat 130 and the height of the cushion 131 of the driver's seat 130 from the floor surface of the vehicle 100 based on the input driver's seat positioning information. In addition, the controller 150 may adjust the angle of the backrest 132 of the driver's seat 130 based on the input driver's seat positioning information.

In addition, the controller 150 according to an embodiment may obtain the driver's seat positioning information in determination of the covered area 300 from the storage 160, and obtain the position information and the angle information of the driver's seat 130 from the driver's seat positioning information.

The controller 150 according to an embodiment may determine the distance between the steering wheel 120 and the driver's seat 130 and the angle between the steering wheel 120 and the driver's seat 130 based on the driver's seat positioning information. Here, the controller 150 considers the steering wheel positioning information indicating the position and angle of the steering wheel 120.

The steering wheel positioning information may include at least one of the position information of the steering wheel 120 and the angle information of the steering wheel 120. The position information of the steering wheel 120 may include the height information of the steering wheel 120 with respect to the floor surface of the vehicle 100, and the angle information of the steering wheel 120 may correspond to the angle of the steering wheel 120 oriented with respect to the floor surface of the vehicle 100.

The steering wheel positioning information may be input by the driver using the input devices 170. The controller 150 may adjust the position and angle of the steering wheel 120 based on the input steering wheel positioning information.

In addition, the steering wheel positioning information may be stored in the storage 160. The controller 150 according to an embodiment may obtain the steering wheel positioning information in determination of the covered area 300 from the storage 160, and obtain the position information and angle information of the steering wheel 120 using the obtained steering wheel positioning information.

That is, the controller 150 may determine the distance between the steering wheel 120 and the driver's seat 130 and the angle between the steering wheel 120 and the driver's seat 130 by comparing the position information and the angle information of the driver's seat 130 according to the driver's seat positioning information and the position information and the angle information of the steering wheel 120 according to the steering wheel positioning information.

The controller 150 may determine the position 450 of the eyes of the driver 400 based on the distance and angle between the steering wheel 120 and the driver's seat 130 and the driver height information, and obtain the eye position information based on the determined position 450 of the eyes of the driver 400.

The driver height information according to an embodiment may correspond to the height information of the driver 400 which is input by the driver 400 using the input devices 170 and stored in the storage 160.

In addition, the driver height information according to an embodiment may correspond to the average height information of adults stored in the storage 160.

The controller 150 may obtain distance information 410 between the steering wheel 120 and the position 450 of the eyes of the driver 400 and angle information 420 between the steering wheel 120 and the position 450 of the eyes of the driver 400 based on the distance and angle between the steering wheel 120 and the driver's seat 130 and the driver height information.

Specifically, the controller 150 may identify the position and angle of the driver's seat 130 based on the driver's seat positioning information, and estimate the position 450 of the eyes when the driver 400 is seated on the driver's seat 130 based on the driver height information.

That is, the controller 150 may estimate a sitting height of the driver 400 based on the height information of the driver 400 or the average height information in the driver height information, and determine the position 450 of the eyes of the driver 400 seated on the driver's seat 130 based on the estimated sitting height of the driver 400.

The controller 150 may obtain the distance information 410 between the steering wheel 120 and the position 450 of the eyes of the driver 400 and the angle information 420 between the steering wheel 120 and the position 450 of the eyes of the driver 400 based on the determined position 450 of the eyes and the distance and angle between the steering wheel 120 and the driver's seat 130.

The controller 150 may determine the position 450 of the eyes of the driver 400 with respect to the steering wheel 120 based on the obtained distance information 410 and the obtained angle information 420, and obtain the eye position information indicating the position 450 of the eyes of the driver 400 with respect to the steering wheel 120 based on the determined position 450 of the eyes.

The controller 150 according to an embodiment may obtain the eye position information indicating the position 450 of the eyes of the driver 400 with respect to the steering wheel 120 based on the vehicle interior image captured by the at least one image sensor 140.

The controller 150 may obtain the distance information 410 between the steering wheel 120 and the position 450 of the eyes of the driver 400 and the angle information 420 between the steering wheel 120 and the position 450 of the eyes of the driver 400 based on the vehicle interior image captured by the at least one image sensor 140.

The at least one image sensor 140 according to an embodiment may be provided on at least one side of the steering wheel 120 in the front direction of the driver 400. Specifically, the at least one image sensor 140 according to an embodiment may be provided on a rear side of the steering wheel 120. For example, the at least one image sensor 140 may be provided between the steering wheel 120 and the dashboard 210.

Accordingly, the at least one image sensor 140 may be provided on at least one side of the steering wheel 120 to capture a facial image of the driver 400. Thus, the vehicle interior image captured by the at least one image sensor 140 includes the facial image of the driver 400 captured from one side of the steering wheel 120.

The controller 150 may determine the position 450 of the eyes of the driver 400 with respect to the steering wheel 120 based on the facial image of the driver 400 captured from at least one side of the steering wheel 120, and obtain the eye position information indicating the position 450 of the eyes of the driver 400 with respect to the steering wheel 120 based on the determined position 450 of the eyes.

That is, the controller 150 may measure the distance between the steering wheel 120 and the eyes of the driver 400 and the angle between the steering wheel 120 and the eyes of the driver 400 based on the facial image of the driver 400 captured from at least one side of the steering wheel 120, determine the position 450 of the eyes of the driver 400 with respect to the steering wheel 120 based on the measured distance and angle, and obtain the eye position information indicating the position 450 of the eyes of the driver 400 with respect to the steering wheel 120 based on the determined position 450 of the eyes.

That is, the controller 150 according to an embodiment may obtain the eye position information indicating the position 450 of the eyes of the driver 400 with respect to the steering wheel 120 based on at least one of the driver's seat positioning information and the vehicle interior image. The eye position information may include the distance information 410 between the steering wheel 120 and the position 450 of the eyes of the driver 400 and the angle information 420 between the steering wheel 120 and the position 450 of the eyes of the driver 400.

Figure 5:
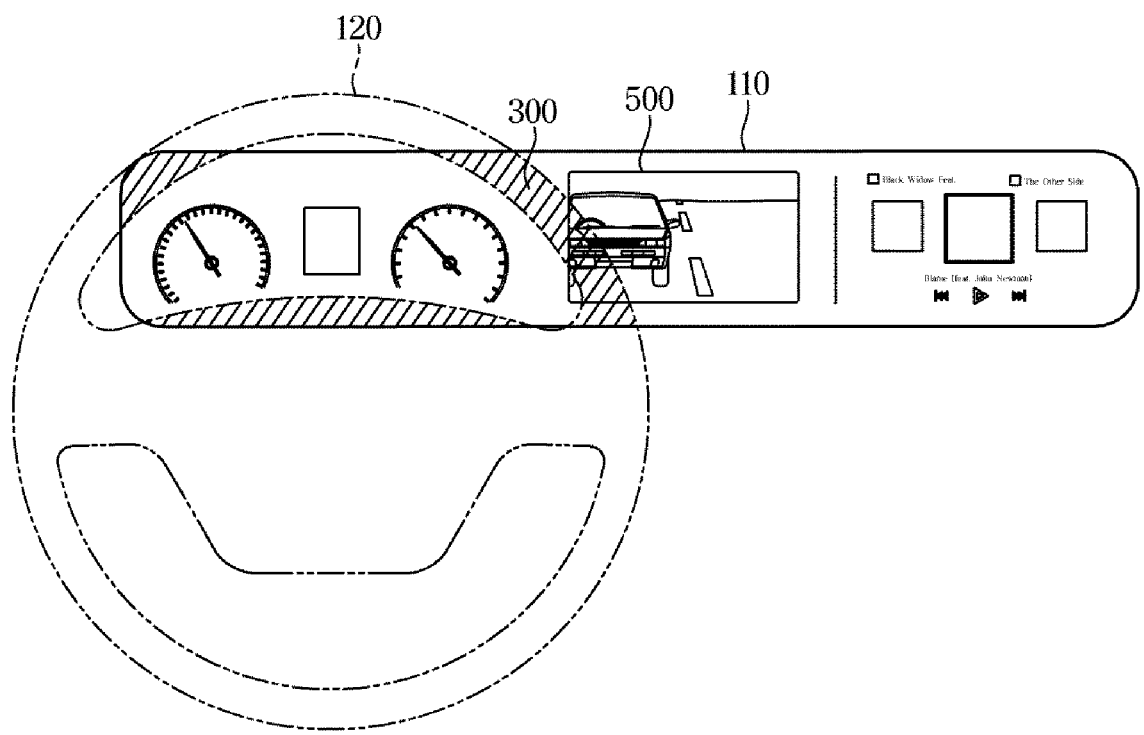
FIG. 5 is a view illustrating a situation in which an image is located in the covered area in the vehicle according to an exemplary embodiment of the present disclosure.
Figure 6:
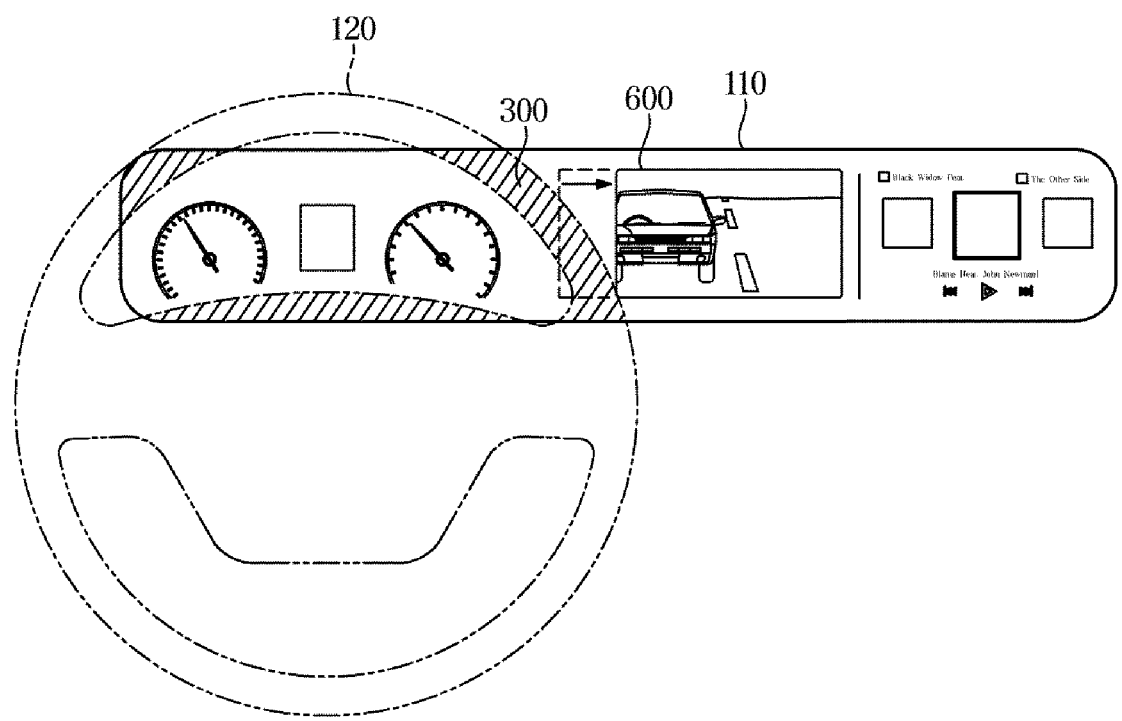
FIG. 6 illustrates a situation in which the vehicle according to an exemplary embodiment of the present disclosure adjusts an output position of the image located in the covered area.

FIG. 5 is a view illustrating a situation in which an image 500 is located in the covered area 300 in the vehicle 100 according to an embodiment, and FIG. 6 is a view illustrating a situation in which the vehicle 100 according to an embodiment adjusts the output position of the image 500 located in the covered area 300.

Referring to FIG. 5, the image 500 may be located in the covered area 300 on the display 110 according to an embodiment.

That is, the vehicle 100 according to an embodiment may have the covered area 300 on the display 110, covered by the steering wheel 120, and the driver 400 may not receive the image 500 located in the covered area 300.

Accordingly, the controller 150 according to an embodiment may determine the covered area 300 on the display 110, covered by the steering wheel 120, based on the eye position information and the steering wheel positioning information.

Specifically, the controller 150 may determine the covered area 300 based on the eye position information indicating the position 450 of the eyes of the driver 400 with respect to the steering wheel 120 and the steering wheel positioning information indicating the position and angle of the steering wheel 120.

The controller 150 may determine the covered area 300 on the display 110, covered from the driver's view by the steering wheel 120, based on the distance information 410 between the steering wheel 120 and the position 450 of the eyes of the driver 400 and the angle information 420 between the steering wheel 120 and the position 450 of the eyes of the driver 400.

The controller 150 according to an embodiment may generate a plurality of virtual lines linearly connecting the position 450 of the eyes of the driver 400 and a plurality of points on the display 110 based on the eye position information, and determine some virtual lines among the plurality of virtual lines which are covered by the steering wheel 120 and not directly connected to the display 110 based on the steering wheel positioning information.

The controller 150 may determine the covered area 300 on the display 110, covered by the steering wheel 120, based on some virtual lines among the plurality of virtual lines which are covered by the steering wheel 120 and not directly connected to the display 110.

The controller 150 according to an embodiment may adjust an output position of the image 500 output on the display 110 based on the covered area 300. That is, the controller 150 may move the image 500 located in the covered area 300 to an area other than the covered area 300.

Specifically, the controller 150 according to an embodiment may determine whether or not the image 500 to be output in the covered area 300 of the display 110 is present.

Referring to FIG. 6, when the image 500 is present in the covered area 300, the controller 150 may compare a type of the image 500 located in the covered area 300 with the previously-stored image type data to determine whether or not the type of the image 500 located in the covered area 300 corresponds to an adjustment target type included in the image type data.

The image type data may be stored in the storage 160, and may include a preset list of adjustment target types in order to determine a degree of importance of the image 500 located in the covered area 300. When the type of the image 500 located in the covered area 300 corresponds to an adjustment target type included in the image type data, the controller 150 may adjust the output position of the image 500 located in the covered area 300 so as to be in an area other than the covered area 300.

The adjustment target types according to an embodiment may include the external image of the vehicle output on the display 110 as an image. The external image of the vehicle may correspond to information essentially required for safe driving of the vehicle 100. When the external image of the vehicle is located in the covered area 300 and the driver does not receive the external image of the vehicle, the probability of a vehicle accident may be increased. The external image of the vehicle may include, for example, a forward image, a rear image, and rear side images.

The adjustment target types according to an embodiment may include the driving information output on the display 110 as an image. The driving information may correspond to information essentially required for safe driving of the vehicle 100. When the driving information is located in the covered area 300 and the driver does not receive the driving information, the probability of a vehicle accident may be increased. The driving information may include a vehicle speed, an engine RPM, a cooling water temperature, a fuel level, a shift gear status, a driven distance, a drivable distance, and the like.

The external image of the vehicle and the driving information, which may be directly related to safe driving of the vehicle 100, as described above, may be set as default values of the adjustment target types and included in the image type data.

Accordingly, when the external image of the vehicle and the driving information are located in the covered area 300, the controller 150 may adjust the output position of the image 500 indicating the external image of the vehicle and the driving information, so that the driver may receive the external image of the vehicle and the driving information, which are not covered.

In addition, the adjustment target types according to an embodiment may be set based on inputs made by the driver 400 using the input devices 170. That is, the driver 400 may set adjustment target types to be output position adjustment targets in the image 500 located in the covered area 300 using the input devices 170.

Specifically, the controller 150 according to an embodiment may determine the adjustment target types based on inputs of the driver 400, and update the image type data based on the determined adjustment target types.

Accordingly, the vehicle 100 may adjust the output position of a type of image set by the driver 400 among the images 500 located in the covered area 300 so as to provide the type of image desired by the driver 400.

When the image 500 located in the covered area 300 corresponds to an adjustment target type, the controller 150 according to an embodiment may adjust the output position of the image 500 located in the covered area 300 so as to be in an area other than the covered area 300. That is, the controller 150 may move the image 500 located in the covered area 300 to an area other than the covered area 300.

The controller 150 according to an embodiment may control the display 110 to output the image 500 in the area other than the covered area 300 based on the adjusted output position of the image 500 located in the covered area 300. Accordingly, the driver 400 may be provided with an output position-adjusted image 600, the output position of which is adjusted, so that the image 600 is not covered by the steering wheel 120.

That is, the controller 150 may provide the output position-adjusted image 600 not covered by the steering wheel 120, to the driver 400 by adjusting the output position of the image 500 located in the covered area 300 on the display 110, covered by the steering wheel 120.

That is, under the control of the controller 150, the driver 400 may be provided with the output position-adjusted image 600 on the display 110, which is not covered by the steering wheel 120.

Hereinafter, a control method of the vehicle 100 according to an embodiment will be described. The above-described vehicle 100 according to an embodiment may be applied to the following control method of the vehicle 100. Accordingly, unless specifically stated, the foregoing descriptions given with reference to FIGS. 1 to 6 may be equally applied to the control method of the vehicle 100 according to an embodiment.

Figure 7:
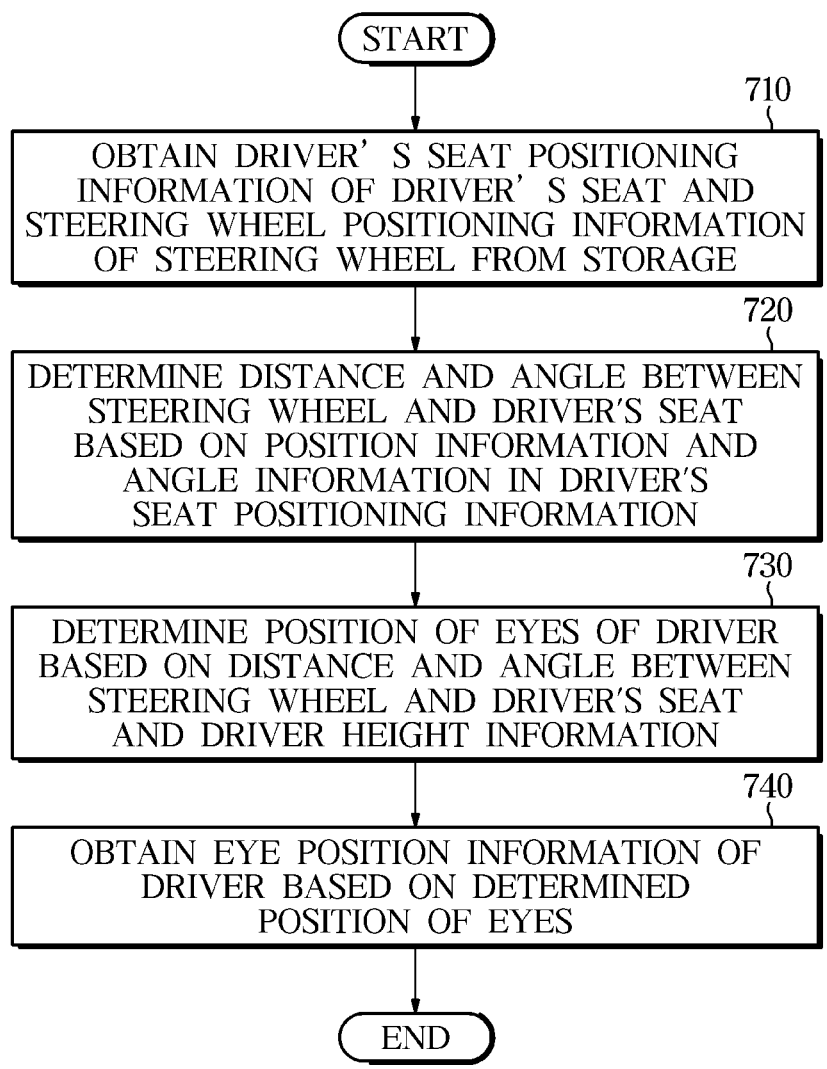
FIG. 7 is a flowchart illustrating a process of obtaining eye position information based on driver's seat positioning information in a control method of the vehicle according to an exemplary embodiment of the present disclosure.

FIG. 7 is a flowchart illustrating a process of obtaining eye position information based on driver's seat positioning information in the control method of the vehicle according to an embodiment.

Referring to FIG. 7, the controller 150 according to an embodiment may obtain the driver's seat positioning information of the driver's seat 130 and the steering wheel positioning information of the steering wheel 120 from the storage 160 (710).

The driver's seat positioning information may include at least one of the position information of the driver's seat 130 and the angle information of the driver's seat 130. The position information of the driver's seat 130 may include the front-rear position information of the cushion 131 of the driver's seat 130 and the height information of the cushion 131 of the driver's seat 130. The angle information of the driver's seat 130 may include the angle information of the backrest 132 of the driver's seat 130.

The driver's seat positioning information may be input by the driver 400 using the input devices 170. The controller 150 may adjust the position and angle of the driver's seat 130 based on the input driver's seat positioning information.

In addition, the driver's seat positioning information may be stored in the storage 160, so that the position and angle of the driver's seat 130 may be maintained. The controller 150 may obtain the position information and the angle information of the driver's seat 130 in determination of the covered area 300 based on the driver's seat positioning information stored in the storage 160 in determination of the covered area 300.

The controller 150 according to an embodiment may determine the distance and angle between the steering wheel 120 and the driver's seat 130 based on the position information and the angle information in the driver's seat positioning information (720). Here, the controller 150 considers the steering wheel positioning information indicating the position and angle of the steering wheel 120.

The steering wheel positioning information may include the position information of the steering wheel 120 and the angle information of the steering wheel 120. The position information of the steering wheel 120 may include the height information of the steering wheel 120 based on the floor surface of the vehicle 100, and the angle information of the steering wheel 120 may correspond to an angle of the steering wheel 120 oriented with respect to the floor surface of the vehicle 100.

The steering wheel positioning information may be input by the driver 400 using the input devices 170. The controller 150 may adjust the position and angle of the steering wheel 120 based on the input steering wheel positioning information.

In addition, the steering wheel positioning information may be stored in the storage 160. The controller 150 according to an embodiment may obtain the steering wheel positioning information in determination of the covered area 300 from the storage 160.

That is, the controller 150 may determine the distance between the steering wheel 120 and the driver's seat 130 and the angle between the steering wheel 120 and the driver's seat 130 by comparing the position information and the angle information of the driver's seat 130 according to the driver's seat positioning information and the position information and the angle information of the steering wheel 120 according to the steering wheel positioning information.

The controller 150 may determine the position 450 of the eyes of the driver 400 based on the distance and angle between the steering wheel 120 and the driver's seat 130 and the driver height information (730), and obtain the eye position information based on the determined position 450 of the eyes (740).

The driver height information according to an embodiment may correspond to the height information of the driver 400, which is input by the driver 400 using the input devices 170 and stored in the storage 160.

In addition, the driver height information according to an embodiment may correspond to the average height information of adults stored in the storage 160.

The controller 150 may obtain the distance information 410 between the steering wheel 120 and the position 450 of the eyes of the driver 400 and the angle information 420 between the steering wheel 120 and the position 450 of the eyes of the driver 400 based on the distance and angle between the steering wheel 120 and the driver's seat 130 and the driver height information.

Specifically, the controller 150 may identify the position and angle of the driver's seat 130 based on the driver's seat positioning information, and determine the position 450 of the eyes when the driver 400 is seated on the driver's seat 130 based on the driver height information.

That is, the controller 150 may estimate the sitting height of the driver 400 based on the height information of the driver 400 or the average height information in the driver height information, and determine the position 450 of the eyes of the driver 400 seated on the driver's seat 130 based on the estimated sitting height.

The controller 150 may obtain the distance information 410 between the steering wheel 120 and the position 450 of the eyes of the driver 400 and the angle information 420 between the steering wheel 120 and the position 450 of the eyes of the driver 400 based on the determined position 450 of the eyes and the distance and angle between the steering wheel 120 and the driver's seat 130.

In addition, the controller 150 may determine the position 450 of the eyes of the driver 400 with respect to the steering wheel 120 based on the obtained distance information 410 and the obtained angle information 420, and obtain the eye position information indicating the position 450 of the eyes of the driver 400 with respect to the steering wheel 120 based on the determined position 450 of the eyes.

FIG. 8 is a flowchart illustrating a process of obtaining eye position information based on a vehicle interior image in the control method of the vehicle 100 according to an embodiment.

The controller 150 according to an embodiment may obtain a vehicle interior image from the image sensor 140 (810). The image sensor 140 according to an embodiment may be provided on at least one side of the steering wheel 120 in the front direction of the driver 400.

Specifically, the image sensor 140 according to an embodiment may be provided on a rear side of the steering wheel 120. For example, the image sensor 140 may be provided between the steering wheel 120 and the dashboard 210.

Accordingly, the image sensor 140 may be provided on at least one side of the steering wheel 120 to capture a facial image of the driver 400. Thus, the vehicle interior image captured by the image sensor 140 includes the facial image of the driver 400 captured from one side of the steering wheel 120.

The controller 150 may determine the distance and angle between the steering wheel 120 and the eyes of the driver 400 based on the vehicle interior image (820). That is, the controller 150 may measure the distance between the steering wheel 120 and the eyes of the driver 400 and the angle between the steering wheel 120 and the eyes of the driver 400 based on the vehicle interior image.

The controller 150 may determine the position 450 of the eyes of the driver 400 based on the distance and angle between the steering wheel 120 and the eyes of the driver 400 (830), and obtain the eye position information of the driver 400 based on the determined position 450 of the eyes (840).

Specifically, the controller 150 may estimate the position 450 of the eyes of the driver 400 with respect to the steering wheel 120 based on the facial image of the driver 400 captured from at least one side of the steering wheel 120, and obtain the eye position information indicating the position 450 of the eyes of the driver 400 with respect to the steering wheel 120 based on the estimated position 450 of the eyes.

That is, the controller 150 may measure the distance between the steering wheel 120 and the eyes of the driver 400 and the angle between the steering wheel 120 and the eyes of the driver 400 based on the facial image of the driver 400 captured from at least one side of the steering wheel 120, determine the position 450 of the eyes of the driver 400 with respect to the steering wheel 120 based on the measured distance and angle, and obtain the eye position information indicating the position 450 of the eyes of the driver 400 with respect to the steering wheel 120 based on the determined position 450 of the eyes.

FIG. 9 is a flowchart illustrating a process of adjusting the output position of the image 500 in the control method of the vehicle 100 according to an embodiment.

Referring to FIG. 9, the image 500 may be located in the covered area 300 on the display 110 according to an embodiment. That is, the vehicle 100 according to an embodiment may have the covered area 300 on the display 110 covered by the steering wheel 120, and the driver 400 may not receive the image 500 located in the covered area 300.

Accordingly, the controller 150 according to an embodiment may determine the covered area 300 based on the eye position information and the steering wheel positioning information (910).

Specifically, the controller 150 may determine the covered area 300 based on the eye position information indicating the position 450 of the eyes of the driver 400 with respect to the steering wheel 120 and the steering wheel positioning information indicating the position and angle of the steering wheel 120.

The controller 150 may determine the covered area 300 on the display 110, covered from the view of the driver 400 by the steering wheel 120, based on the distance information 410 between the steering wheel 120 and the position 450 of the eyes of the driver 400 and the angle information 420 between the steering wheel 120 and the position 450 of the eyes of the driver 400.

The controller 150 according to an embodiment may generate a plurality of virtual lines linearly connecting the position 450 of the eyes of the driver 400 and a plurality of points on the display 110 based on the eye position information, and determine some virtual lines among the plurality of virtual lines, which are covered by the steering wheel 120 and not directly connected to the display 110 based on the steering wheel positioning information.

The controller 150 may determine the covered area 300 on the display 110, covered by the steering wheel 120, based on some virtual lines among the plurality of virtual lines, which are covered by the steering wheel 120 and not directly connected to the display 110.

The controller 150 according to an embodiment may adjust the output position of the image 500 output on the display 110 based on the covered area 300.

Specifically, the controller 150 according to an embodiment may determine whether or not the image 500 to be output in the covered area 300 of the display 110 is present.

When the image 500 to be output in the covered area 300 of the display 110 is present (YES in 920), the controller 150 may compare the type of the image 500 located in the covered area 300 with the previously-stored image type data to determine whether or not the type of the image 500 located in the covered area 300 corresponds to an adjustment target type included in the image type data.

The image type data may be stored in the storage 160, and may include a preset list of adjustment target types in order to determine the degree of importance of the image 500 located in the covered area 300.

When the type of the image 500 located in the covered area 300 corresponds to an adjustment target type included in the previously-stored image type data (YES in 930), the controller 150 may adjust the output position of the image 500 located in the covered area 300 so as to be in an area other than the covered area 300 (940).

The adjustment target types according to an embodiment may include the external image of the vehicle output on the display 110 as an image. The external image of the vehicle may include, for example, a forward image, a rear image, and rear side images.

The adjustment target types according to an embodiment may include the driving information output on the display 110 as an image. The driving information may include a vehicle speed, an engine RPM, a cooling water temperature, a fuel level, a shift gear status, a driven distance, a drivable distance, and the like.

The external image of the vehicle and the driving information, which may be directly related to safe driving of the vehicle 100, as described above, may be set as default values of the adjustment target types and included in the image type data.

In addition, the adjustment target types according to an embodiment may be set based on inputs made by the driver 400 using the input devices 170. That is, the driver 400 may set adjustment target types to be output position adjustment targets in the image 500 located in the covered area 300 using the input devices 170.

Specifically, the controller 150 according to an embodiment may determine the adjustment target types based on inputs of the driver 400, and update the image type data based on the determined adjustment target types.

When the image 500 located in the covered area 300 corresponds to an adjustment target type, the controller 150 according to an embodiment may adjust the output position of the image 500 located in the covered area 300 so as to be in an area other than the covered area 300. That is, the controller 150 may move the image 500 located in the covered area 300 to an area other than the covered area 300.

The controller 150 according to an embodiment may control the display 110 to output the image 500 in the area other than the covered area 300 based on the adjusted output position of the image 500 located in the covered area 300 (950). Accordingly, the driver 400 may be provided with an output position-adjusted image 600, the output position of which is adjusted, so that the image 600 is not covered by the steering wheel 120.

That is, the controller 150 may provide the output position-adjusted image 600, not covered by the steering wheel 120, to the driver 400 by adjusting the output position of the image 500 located in the covered area 300 on the display 110, covered by the steering wheel 120. That is, under the control of the controller 150, the driver 400 may be provided with the output position-adjusted image 600 on the display 110, which is not covered by the steering wheel 120.

Embodiments disclosed herein may be implemented in the form of a recording medium in which computer-readable instructions are stored. Instructions may be stored in the form of program codes, and when executed by a processor, may perform the operations of the embodiments disclosed herein by generating program modules. The recording medium may be implemented as a computer readable record medium.

The computer-readable recording medium may be any type of recording medium in which computer-readable instructions are stored. For example, the computer-readable recording medium may be, but is not limited to, read only memory (ROM), random access memory (RAM), a magnetic tape, a magnetic disk, flash memory, and an optical data storage.

The foregoing descriptions and the accompanying drawings have been presented in order to explain the certain principles of the present disclosure. A person skilled in the art to which the present disclosure relates could make various modifications and variations by combining, dividing, substituting for, or changing the elements without departing from the principle of the present disclosure. The foregoing embodiments disclosed herein shall be interpreted as being illustrative, while not being limitative, of the principle and scope of the present disclosure.

What is claimed is:

1. A vehicle comprising:
a position-adjustable steering wheel;
a position-adjustable driver's seat;
a display extending on the dashboard from one side facing the driver's seat to another side in which a center fascia is disposed;
at least one image sensor configured to capture a vehicle interior image including a facial image of a driver;
a storage configured to store driver's seat positioning information of the driver's seat and steering wheel positioning information of the steering wheel; and
a controller configured to obtain eye position information indicating a position of each of eyes of the driver with respect to the steering wheel based on at least one of the driver's seat positioning information or the vehicle interior image, to determine a covered area, which is covered by the steering wheel on the display, based on the eye position information and the steering wheel positioning information, and to adjust an output position of an image output on the display based on the covered area,
wherein the controller is configured to obtain the eye position information by determining a distance and an angle between the steering wheel and the driver's seat based on the driver's seat positioning information and by determining the position of the eyes of the driver based on the distance and the angle between the steering wheel and the driver's seat and driver height information.

2. The vehicle according to claim 1, wherein the driver's seat positioning information comprises position information of the driver's seat and angle information of the driver's seat.

3. The vehicle according to claim 1, wherein the at least one image sensor comprises at least one of a camera configured to capture the vehicle interior image in a visible light range or an infrared camera configured to capture the vehicle interior image in an infrared ray range.

4. The vehicle according to claim 3, wherein the controller obtains the eye position information by determining the distance and the angle between the steering wheel and the eyes of the driver based on the vehicle interior image captured by the at least one image sensor and determining the position of each of the eyes of the driver based on the distance and the angle between the steering wheel and the eyes of the driver.

5. The vehicle according to claim 1, wherein the eye position information comprises distance information between the steering wheel and the position of each of the eyes of the driver and angle information between the steering wheel and the position of each of the eyes of the driver.

6. The vehicle according to claim 1, wherein the controller determines whether or not an image to be output in the covered area of the display is present.

7. The vehicle according to claim 6, wherein, when the image to be output in the covered area is present, the controller compares a type of the image with previously-stored image type data and determines whether or not the type of the image corresponds to an adjustment target type included in the image type data.

8. The vehicle according to claim 7, wherein the adjustment target type comprises at least one of a rear side image, a rear image, or driving information of the vehicle.

9. The vehicle according to claim 7, further comprising an input device configured to receive an input of the driver,
wherein the controller updates the image type data by determining the adjustment target type based on the input of the driver.

10. The vehicle according to claim 7, wherein, when the type of the image corresponds to the adjustment target type, the controller adjusts the output position of the image to be in an area other than the covered area.

11. The vehicle according to claim 10, wherein the controller controls the display to output the image based on the adjusted output position of the image.

12. A control method of a vehicle, comprising steps of:
obtaining a vehicle interior image including a facial image of a driver using at least one image sensor;
obtaining driver's seat positioning information of a driver's seat and steering wheel positioning information of the steering wheel stored in a storage, wherein the driver's seat and the steering wheel are configured to be position-adjustable;
obtaining eye position information indicating a position of each of eyes of the driver with respect to the steering wheel based on at least one of the driver's seat positioning information or the vehicle interior image;
determining a covered area, which is covered by the steering wheel on a display, based on the eye position information and the steering wheel positioning information, wherein the display extends from one side of a dashboard facing the driver's seat to another side of the dashboard, in which a center fascia is disposed; and
adjusting an output position of an image output on the display based on the covered area,
wherein the step of obtaining the eye position information comprises:
determining a distance and an angle between the steering wheel and the driver's seat based on the driver's seat positioning information; and
determining the position of each of the eyes of the driver based on the distance and the angle between the steering wheel and the driver's seat and driver height information.

13. The control method according to claim 12, wherein the driver's seat positioning information comprises position information of the driver's seat and angle information of the driver's seat.

14. The control method according to claim 12, wherein the vehicle interior image comprises at least one of the vehicle interior image in a visible light range or the vehicle interior image in an infrared ray range.

15. The control method according to claim 14, wherein the step of obtaining the eye position information comprises:
determining the distance and the angle between the steering wheel and the eyes of the driver based on the vehicle interior image captured by the at least one image sensor; and
determining the position of each of the eyes of the driver based on the distance and the angle between the steering wheel and the eyes of the driver.

16. The control method according to claim 12, wherein the eye position information comprises distance information between the steering wheel and the position of each of the eyes of the driver and angle information between the steering wheel and the position of each of the eyes of the driver.

17. The control method according to claim 12, further comprising a step of determining whether or not an image to be output in the covered area of the display is present.

18. The control method according to claim 17, further comprising steps of, when the image to be output in the covered area is present:
- comparing a type of the image with previously-stored image type data; and
- determining whether or not the type of the image corresponds to an adjustment target type included in the image type data.

19. The control method according to claim 18, wherein the adjustment target type comprises at least one of a rear side image, a rear image, or driving information of the vehicle.

20. The control method according to claim 18, further comprising steps of:
- receiving an input of the driver; and
- updating the image type data by determining the adjustment target type based on the input of the driver.

21. The control method according to claim 18, further comprising a step of, when the type of the image corresponds to the adjustment target type adjusting the output position of the image to be in an area other than the covered area.

22. The control method according to claim 21, further comprising a step of controlling the display to output the image based on the adjusted output position of the image.

* * * * *